United States Patent
Bayer et al.

(10) Patent No.: US 7,437,306 B1
(45) Date of Patent: Oct. 14, 2008

(54) CUSTOMER BUYING PATTERN DETECTION IN CUSTOMER RELATIONSHIP MANAGEMENT SYSTEMS

(75) Inventors: Judith A. Bayer, Ridgewood, NJ (US); Scott M. Collins, Raleigh, NC (US)

(73) Assignee: Teradata US, Inc., Miamisburg, OH (US)

( * ) Notice: Subject to any disclaimer, the term of this patent is extended or adjusted under 35 U.S.C. 154(b) by 969 days.

(21) Appl. No.: 09/998,038

(22) Filed: Nov. 30, 2001

Related U.S. Application Data

(60) Provisional application No. 60/299,511, filed on Jun. 19, 2001.

(51) Int. Cl.
*G06F 17/30* (2006.01)
(52) U.S. Cl. .................................. 705/10
(58) Field of Classification Search ............ 705/10
See application file for complete search history.

(56) References Cited

U.S. PATENT DOCUMENTS

| | | | | |
|---|---|---|---|---|
| 5,227,874 | A * | 7/1993 | Von Kohorn | 705/10 |
| 5,974,396 | A * | 10/1999 | Anderson et al. | 705/10 |
| 6,424,949 | B1 * | 7/2002 | Deaton et al. | 705/14 |
| 6,622,126 | B1 * | 9/2003 | McArdle et al. | 705/26 |
| 6,708,156 | B1 * | 3/2004 | Gonten | 705/10 |
| 6,718,310 | B1 * | 4/2004 | Fuisz et al. | 705/26 |
| 6,839,682 | B1 * | 1/2005 | Blume et al. | 705/10 |
| 6,901,406 | B2 * | 5/2005 | Nabe et al. | 707/102 |
| 2002/0069101 | A1 * | 6/2002 | Vincent | 705/10 |
| 2003/0018514 | A1 * | 1/2003 | Billet et al. | 705/10 |

OTHER PUBLICATIONS

"Frequency marketing builds repeat business" by Bill McDowell, Information Access Company, Aug. 1993.*
"SaveSmart, Inc. Launches Industry's First Personalized Promotions Service on the Internet; Interactive Web Site Delivers Paperless Promotions Targeted to Individual Consumer Needs", Business Wire, Oct. 14, 1996.*
Meadows et al. "Assessing the implementation of market segmentation in retail financial services," International Journal of Service Industry Management, 1998.*
Haker, Paul. "You can't tell the prospects without a marketing database. (key to a successful telemarketing campaign)," Telemarketing, 1992.*
Reinartz et al. "On the profitability of long-life customers in a noncontractual setting: An empirical investigation and implications for marketing," Journal of Marketing, 2000.*
Macchiette et al. "Affinity marketing: What is it and how does it work?" Journal of Product and Brand Management, 1993.*

* cited by examiner

*Primary Examiner*—Catherine M. Tarae
(74) *Attorney, Agent, or Firm*—Gates & Cooper LLP

(57) ABSTRACT

A Customer Relationship Management (CRM) system accesses customer transaction data from a database managed by a Relational Database Management System (RDBMS), and then performs a pattern detection function using the customer transaction data, wherein the pattern detection function finds patterns in customer purchasing behavior, as evidenced by the customer transaction data, related to a sequence of when purchases occur. Specifically, the pattern detection function finds the patterns in the customer purchasing behavior by comparing a focal product set to an analysis product set over a specified time interval.

34 Claims, 6 Drawing Sheets

CUSTOMER BUYING PATTERN DETECTION IN CUSTOMER RELATIONSHIP MANAGEMENT SYSTEMS

CROSS REFERENCE TO RELATED APPLICATIONS

This application claims priority under 35 U.S.C. §119(c) to the following and commonly-assigned patent application:

Provisional Application Ser. No. 60/299,511, entitled "CUSTOMER BUYING PATTERN DETECTION IN CUSTOMER RELATIONSHIP MANAGEMENT SYSTEMS," filed on Jun. 19, 2001, by Judy A. Bayer and Scott M. Collins; which application is incorporated by reference herein.

This application is related to the following co-pending and commonly assigned patent applications:

Utility application Ser. No. 09/998,750, entitled "AUTOMATED PROMOTION RESPONSE MODELING IN A CUSTOMER RELATIONSHIP MANAGEMENT SYSTEM," filed on Nov. 30, 2001, by Judy A. Bayer and Scott M. Collins;

Utility application Ser. No. 09/998,680, entitled "ANALYTIC DATA SET CREATION FOR MODELING IN A CUSTOMER RELATIONSHIP MANAGEMENT SYSTEM," filed on Nov. 30, 2001, by Judy A. Bayer and Scott M. Collins; both of which applications are incorporated by reference herein.

BACKGROUND OF THE INVENTION

1. Field of the Invention

This invention relates in general to customer relationship management systems performed by computers, and in particular, to the implementation of a "pattern detection" function for use by a customer relationship management system in accessing data from a relational database management system.

2. Description of Related Art

Computer-implemented customer relationship management (CRM) systems are used to help companies more effectively understand and communicate with their individual customers. Generally, CRM systems are implemented to support the marketing activities of a company, including modeling customer behavior, personalizing marketing activities directed at customers, and communicating with customers. Towards this end, CRM systems typically provide the capability to analyze what is transpiring in the business from customer, product and event viewpoints.

However, the analysis capabilities of prior CRM systems do not provide all the functionality needed. There is a need, especially, for pattern detection capabilities that detect temporal patterns in the data mined from a relationship database management system and that provide the ability to automatically take marketing action based on customers who exhibit certain patterns.

SUMMARY OF THE INVENTION

A Customer Relationship Management (CRM) system accesses customer transaction data from a database managed by a Relational Database Management System (RDBMS), and then performs a pattern detection function using the customer transaction data, wherein the pattern detection function finds patterns in customer purchasing behavior, as evidenced by the customer transaction data, related to a sequence of when purchases occur. Specifically, the pattern detection function finds the patterns in the customer purchasing behavior by comparing a focal product set to an analysis product set over a specified time interval.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

A customer relationship management system performs a pattern detection function using customer transaction data retrieved from a relational database. Using the pattern detection function, the customer relationship management system has the capability to:

Find patterns in the customer purchasing behavior, as evidenced by the customer transaction data, by comparing a focal product set to an analysis product set for any level of a product hierarchy over a specified time interval.

Discover which of the patterns in the customer purchasing behavior are important as indicators of future purchases.

Discover the time interval for the customer purchasing behavior leading up to and after a significant purchase.

Hardware and Software Environment

Figure 1:
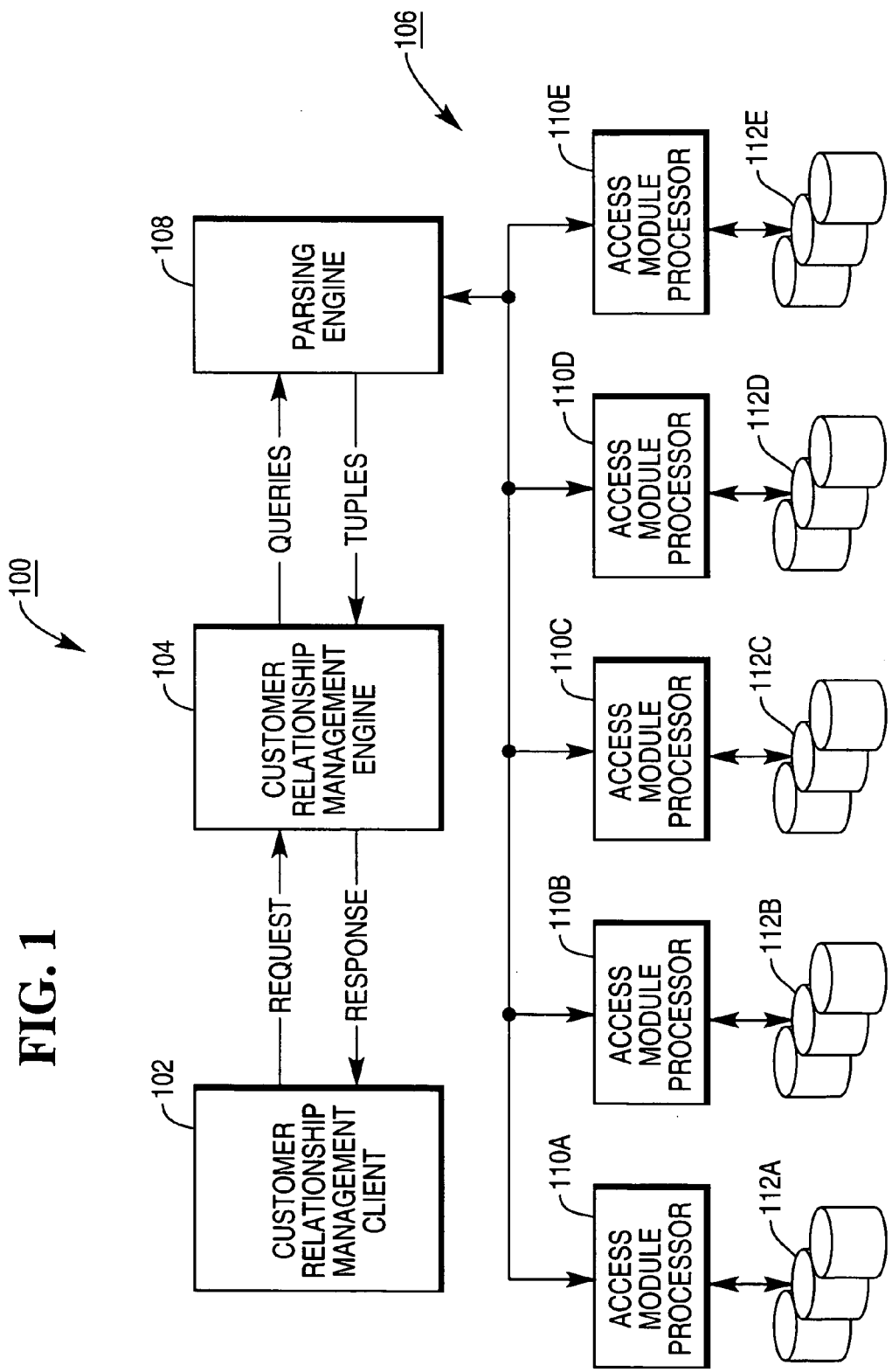
FIG. 1 illustrates an exemplary hardware and software environment according to the preferred embodiment of the present invention.

FIG. 1 illustrates an exemplary hardware and software environment according to the preferred embodiment of the present invention. In the exemplary environment, a computer system 100 implements a Customer Relationship Management (CRM) system in a three-tier client-server architecture, wherein the first or client tier provides a Customer Relationship Management (CRM) Client 102 that may include, inter alia, a graphical user interface (GUI), the second or middle tier provides a Customer Relationship Management (CRM) Engine 104 for data mining applications as described later in this application, and the third or server tier comprises a Relational DataBase Management System (RDBMS) 106 that stores the data and metadata necessary for the CRM system in a relational database. The first, second, and third tiers may be implemented in separate machines, or may be implemented as separate or related processes in a single machine.

In the preferred embodiment, an operator interacts with the GUI of the CRM Client 102 to create requests that are transmitted to the CRM Engine 104 and to display responses received from the CRM Engine 104. The CRM Engine 104 performs the data mining applications and other processing, including commands or functions for performing various search and retrieval functions in the RDBMS 106, wherein queries are transmitted to the RDBMS 106 as requests and tuples are received therefrom as responses. The CRM Client 102, CRM Engine 104, and RDBMS 106 may be implemented in separate machines, or may be implemented as separate or related processes in a single machine.

In the preferred embodiment, the RDBMS 106 includes at least one Parsing Engine (PE) 108 and one or more Access Module Processors (AMPs) 110A-110E storing the relational database in one or more data storage devices 112A-112E. The Parsing Engine 108 and Access Module Processors 110 may be implemented in separate machines, or may be implemented as separate or related processes in a single machine. The RDBMS 106 used in the preferred embodiment comprises the Teradata® RDBMS sold by NCR Corporation, the assignee of the present invention, although other DBMS's could be used.

In the preferred embodiment, the system 100 may use any number of different parallelism mechanisms to take advantage of the parallelism offered by multiple Access Module Processors 110. Further, data within the relational database may be fully partitioned across all data storage devices 112 in the system 100 using hash partitioning or other partitioning methods.

Generally, the CRM Client 102, CRM Engine 104, RDBMS 106, Parsing Engine 108, and/or Access Module Processors 110A-110E comprise logic and/or data tangibly embodied in and/or accessible from a device, media, carrier, or signal, such as RAM, ROM, one or more of the data storage devices 112A-112E, and/or a remote system or device communicating with the computer system 100 via one or more data communications devices.

However, those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

Pattern Detection Function

The pattern detection function performed by the CRM Client 102 and CRM Engine 104 find patterns in customer buying behavior, as evidenced by customer transaction data stored in the relational database managed by the RDBMS 106, related to a sequence of when purchases occur. For example, the pattern detection function can be used to understand which products customers typically purchase with other products over time.

Specifically, a key aspect of the pattern detection function is determining when an analysis product set is purchased after an initial purchase from a focal product set over a specified time interval. The focal product set is specified by the user, via the CRM Client 102, and includes products that trigger a sequence of the customer purchasing behavior for the specified time interval. The analysis product set is also specified by the user, via the CRM Client 102, and includes products that describe the customer purchasing behavior.

To create a chart of the results from the pattern detection function, the user must:

1. Define the customer level to analyze (e.g., individual or household).

2. Determine the time frame for the initial focal product purchase (e.g., January through June of the year 2001). Note that initial transactions for customers may take place at any point during this time frame. Customer purchases are automatically aligned for the analysis.

3. Determine the number of days in each interval (e.g., 30-day intervals).

4. Determine the number of intervals before and after the initial focal product purchase.

5. Specify the focal product set (e.g., the Men's and Home categories).

6. Define the analysis product set (e.g., the Home and Furniture categories).

7. Select a group of customers to analyze (e.g., all customers with a preferred store in Seattle). Customers can be selected based on any attributes.

8. Filter the customer transaction data using one or more specific attributes for the focal product set. These attributes may include purchase location, product, method of payment or other attributes.

9. Filter the customer transaction data using one or more specified attributes for the analysis product set. These attributes may include purchase location, product, method of payment or other attributes.

From a different perspective, prior to creating a pattern detection chart, the user needs to define the who, what, and when variables for the chart. The Table provided below identifies the "who," "what," and "when" variables that may be used for the pattern detection function.

TABLE

Defining The Who, What and When Variables

| Who | What | When |
|---|---|---|
| Customers to analyze | Focal product set | Time frame for initial focal product set purchase |
| Customer level | Analysis product set | Time interval for analysis product set purchase |
| | Measure of analysis product | Number of intervals for analysis product set purchases before and after focal product set purchase |
| | Focal filter transactions | |
| | Analysis filter transactions | |

With regard to the customers to analyze, the user selects a segment of customers from the database managed by the RDBMS 106 based on one or more specified attributes, wherein the selected segment of customers is used to identify the customer transaction data used in the pattern detection function. For example, a Segmentation service allows the user to segment customers using criteria such as store location, customer location, customer demographics, product purchases, response to past promotions, contact history, etc. After specifying the segment of customers using the GUI of the CRM Client 102, the CRM Engine 104 generates SQL (Structured Query Language) statements for a query, which are then processed by the RDBMS 106, and the results therefrom returned to the CRM Engine 104. Transaction data associated with these customers is later retrieved from the database managed by the RDBMS 106 for analysis.

With regard to the customer level, this defines the population of individuals whose purchasing behavior will be included as part of the analysis. The user specifies the customer level to determine how to "roll up" or aggregate the customer transaction data representing purchases. For example, if the customer level is individual, the first purchase of the focal product will be calculated by the CRM Engine 104 for each individual in a household, and each individual will be counted separately. On the other hand, if the customer level is household, then the first purchase of the focal product by any member of the household is used as time interval 0 by the CRM Engine 104 and purchases of all individuals in the household are used to determine the results of the analysis.

A first purchase of a focal product identifies a reference point (time interval 0) for a customer. Once the reference point is identified, the pattern detection function is performed by the CRM Engine 104 for a specific number of time intervals before and after the reference point. Using the CRM Client 102, the user has the ability to specify the number of intervals as well as the number of days that comprise a time interval.

The relationship between the analysis and focal product sets are displayed in a chart that shows purchases from the analysis product set over a specified time period (e.g., time intervals −2, −1, 0, +1, +2, . . . , etc.). Generally, the chart displays the sum of all customer transaction data for each time interval. However, the customer transaction data can be filtered or otherwise manipulated.

The charts generated by the pattern detection function allow the user to:

- Analyze patterns in the transaction data to discover which occurrences are associated with patterns of future purchases.
- Identify key activity leading up to and after a significant purchase.
- Analyze brand loyalty purchasing patterns and replenishment patterns for consumable goods.
- Choose from any level of the product hierarchy and any product in the database for the analysis of both the focal product set and the analysis product set.
- Identify purchase patterns for the analysis product set in relation to the initial purchase of the focal product set.
- Display the analysis product set in terms of: number of customers, percent of customers, dollar sales, normalized dollar sales, average spending amount, and support.
- Compare two different pattern detection charts next to each other.
- Extend market basket analysis across purchases over periods of time.
- Target customer segments directly from the chart. This means that customers who are identified as having an interesting purchasing pattern can be automatically saved as a new customer segment.
- Plan new programs or campaigns to increase sales.

The Chart Definition Window

Figure 2:
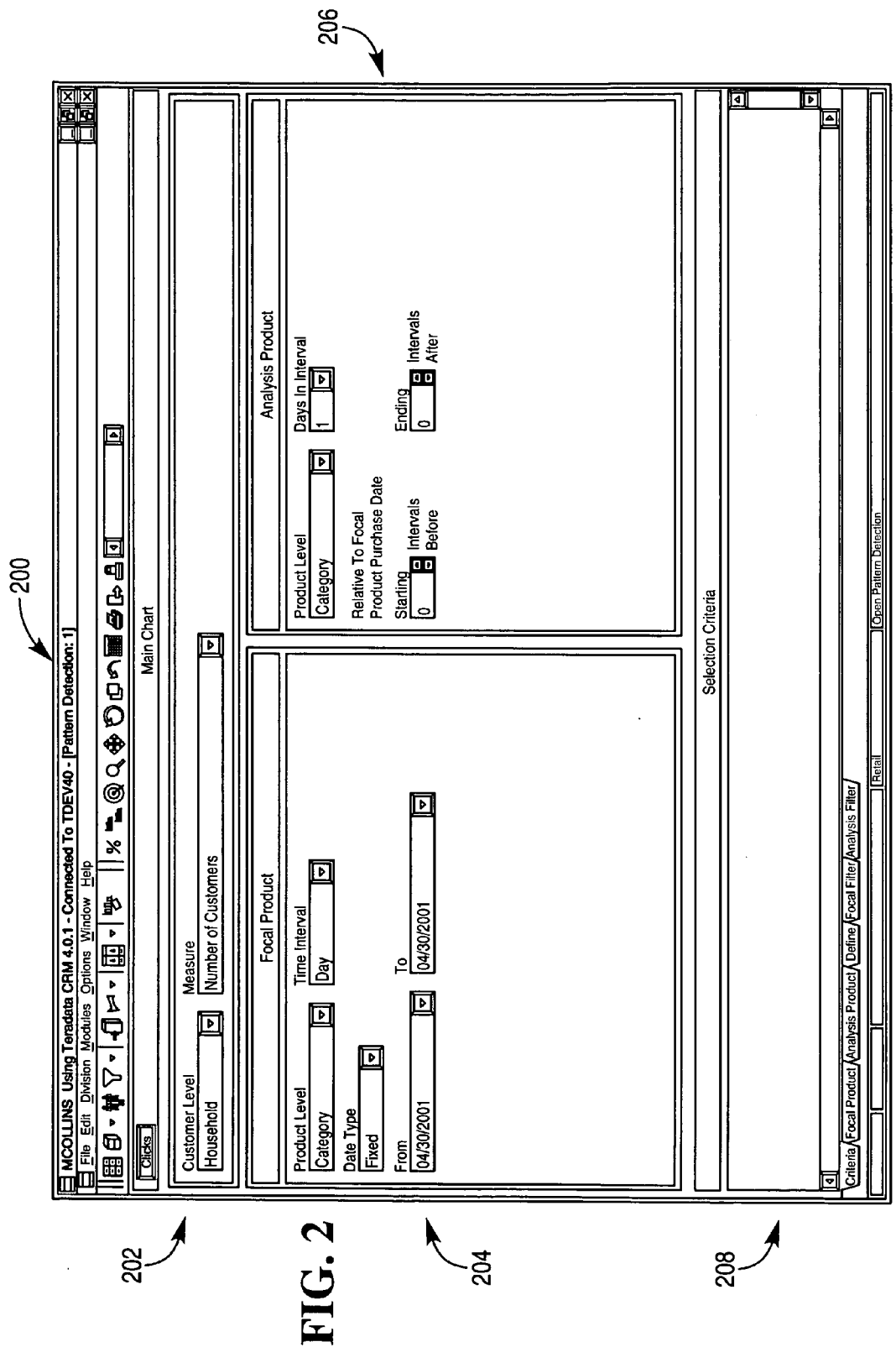
FIG. 2 is a screen snapshot that illustrates a Chart Definition Window displayed by a customer relationship management client for specifying the parameters of the pattern detection function performed by customer relationship management engine according to the preferred embodiment of the present invention.

FIG. 2 is a screen snapshot that illustrates a Chart Definition window 200 displayed by the CRM Client 102 for specifying the parameters of the pattern detection function performed by the CRM Engine 104 according to the preferred embodiment of the present invention. The Chart Definition window 200 is separated into four major panes: a Measures pane 202 for identifying the desired measures, a Focal Product pane 204 for specifying attributes of the focal product set, an Analysis Product pane 206 for specifying attributes of the analysis product set, and a Selection Criteria pane 208 for defining criteria associated with the measures, focal product set and analysis product set.

The Measures pane 202 allows the user to specify the customer level as well as different measures for calculation by the CRM System. In the preferred embodiment, the customer level may be "Household" or "Individual", while the measures comprise the following:

- Number of customers—The number of customers that purchased the analysis product in the time frame.
- Dollar Sales—The number of dollars spent on the analysis product in the time frame.
- Confidence—The number of customers in the time frame for the analysis product divided by the number of customers that purchased the focal product.
- Normalized sales—The number of dollars spent in the time frame for the analysis product divided by the number of customers that purchased the focal product.
- Average spending amount—The number of dollars spent in the time frame for the analysis product divided by the number of customers that purchases the analysis product in the time frame.
- Support—The number of customers that purchased the analysis product in the time frame divided by the number of customers in the segment.

The Focal Product pane 204 allows the user to select the focal product and associated criteria, including Product Level, Time Interval, Date Type, as well as From and To dates. If more than one focal product is selected, then the first purchase of any of the focal products is used as time interval 0. The user must also select a focal time period that the first purchase must fall in to qualify the analysis. The user also has the option to define a filter on transactions that qualify as the first purchase. For example, the user may define the filter as Purchase Amount>$5.00, in which case, all purchases of the focal product that are less than $5.00 are not eligible to determine time interval 0.

The Analysis Product pane 206 allows the user to select the analysis product and associated criteria, including Product Level and Days in Interval, as well as Starting and Ending Intervals (relative to the focal product purchase date). The analysis products are the products that will be included in the results of the analysis. Again, the customer has the option to apply a filter to the analysis products, so only transactions that meet the criteria will be used for the results. The user must also define the number of days that comprise a time interval and the number of time intervals before and after time interval 0 in which to analyze analysis product purchases. The definition of the interval is crucial to finding a pattern: if the interval is too large, the pattern may be obscured by a lack of detail; if the interval is too small, the pattern may also be obscured by too much detail.

The Selection Criteria pane 208 includes six tabs. Each of these tabs displays different types of information:

- Criteria—provides parameter settings from the selection criteria fields.
- Focal Product—displays selection criteria information on the focal product set.
- Analysis Product—displays selection criteria information on the analysis product set.
- Define—displays selection criteria information on the customers analyzed for this pattern detection effort.
- Focal Filter—displays selection criteria information on the focal filter.

Analysis Filter—displays selection criteria information on the analysis filter.

Chart Window

Figure 3:
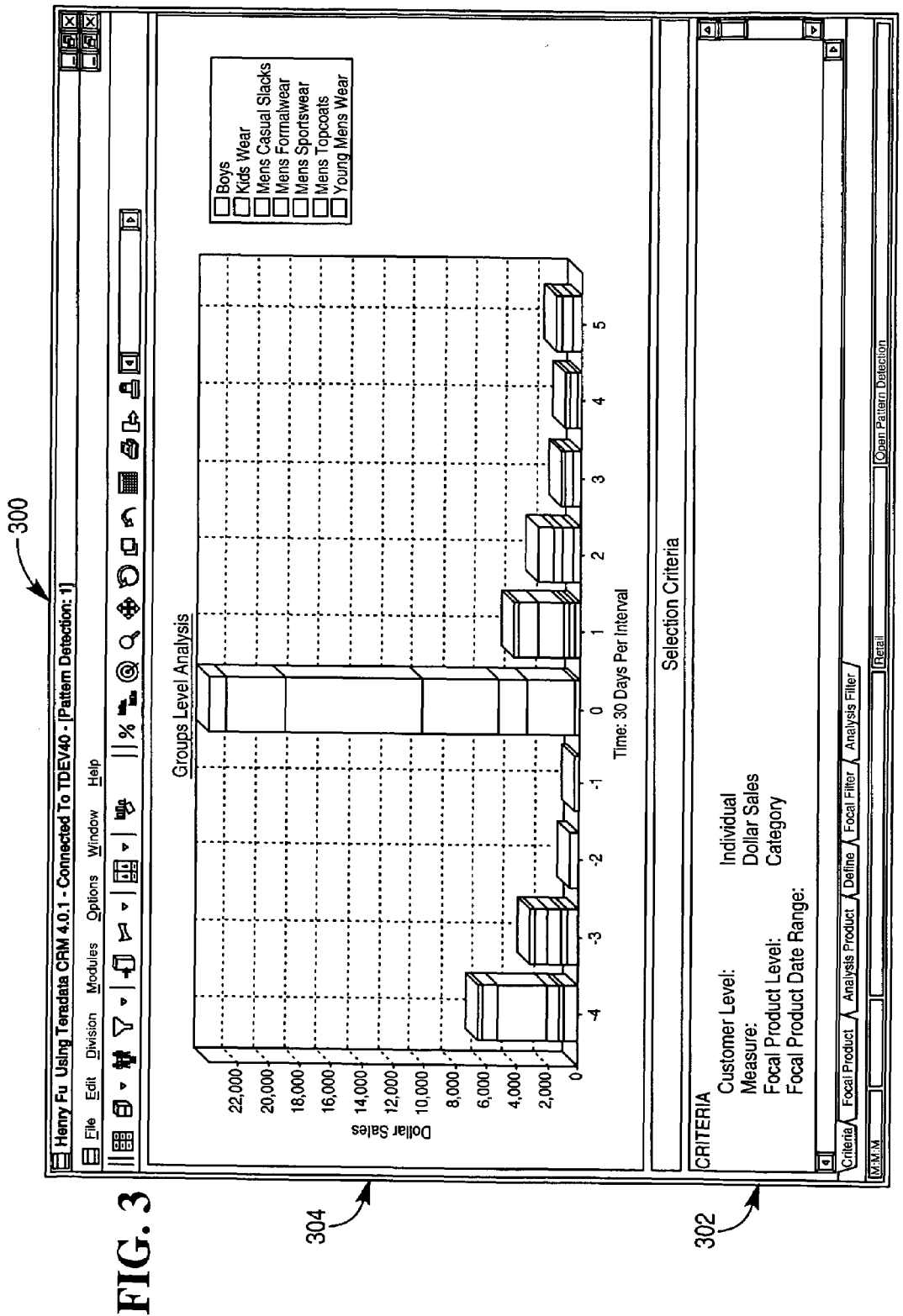
FIG. 3 is a screen snapshot that illustrates a Chart Window displayed by a customer relationship management client for the results of the pattern detection function performed by a customer relationship management engine according to the preferred embodiment of the present invention.

FIG. 3 is a screen snapshot that illustrates a Chart window 300 displayed by the CRM Client 102 for the results from the pattern detection function performed by the CRM Engine 104 according to the preferred embodiment of the present invention. Preferably, the Chart window 300 is comprised of two panes: a Selection Criteria pane 302 and a Chart pane 302.

The Selection Criteria pane 302 corresponds to the Selection Criteria pane 208 of the Chart Definition window 200 of FIG. 2, and shows the defining criteria associated with the measures, focal product set and analysis product set.

The Chart pane 304 displays a chart generated by the pattern detection function that shows the measure for the analysis product set, wherein the displayed chart illustrates purchases from the analysis product set over time intervals before and after an initial purchase of the focal product set. In the preferred embodiment, the results of the pattern detection function appear as a stacked bar chart displayed by the GUI of the CRM Client 102. Each series in a stack represents an analysis product and each stack represents a time interval relative to time interval 0. The user is able to change measures dynamically to evaluate different patterns of behavior.

A chart generated by the pattern detection function contains only information about the analysis product set. The chart illustrates the purchases from the analysis product set over time periods before and after the initial purchase of the focal product set. The time interval 0 represents the day of the initial purchase from the focal product set by the selected customers. All other intervals on the chart reflect the time intervals specified for the analysis product set. The number of intervals to the left or right of time interval 0 are specified in the criteria process.

By examining the chart generated by the pattern detection function, the user can determine if any relationship exists between the focal product set and the analysis product set. If no relationship exists, the user may want to create other pattern detection charts. Alternatively, the user may want a more restrictive focus on products within the analysis product set, or alter the analysis time frames or intervals.

Figure 4:
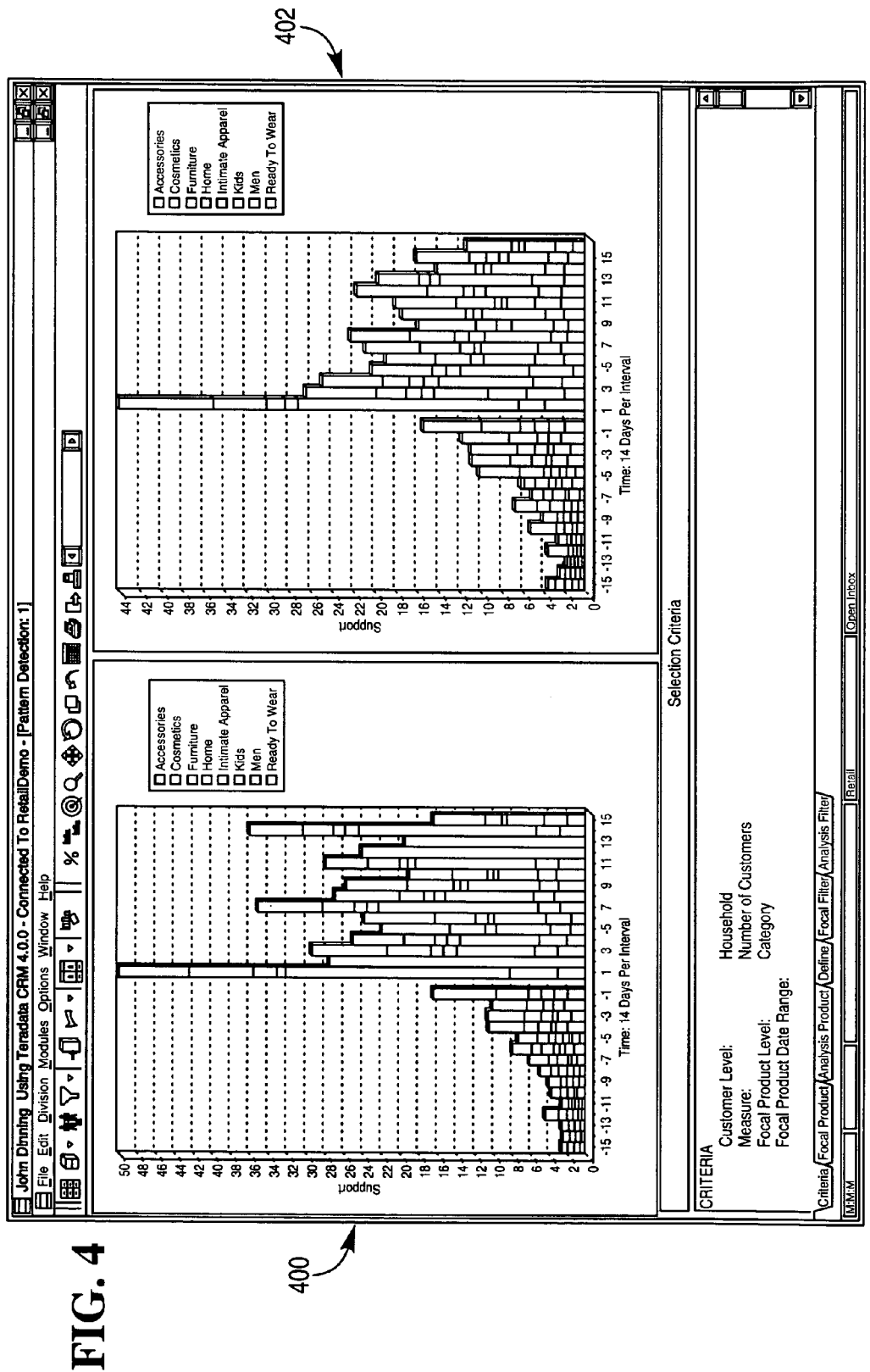
FIG. 4 is a screen snapshot that illustrates two pattern detection charts displayed side-by-side by a customer relationship management client according to the preferred embodiment of the present invention.

FIG. 4 is a screen snapshot that illustrates two pattern detection charts 400 and 402 displayed side-by-side by the CRM Client 102 according to the preferred embodiment of the present invention. The pattern detection function also allows the user to create a second pattern detection chart for a different analysis product set, focal product set, and set of customers. These two pattern detection charts 400 and 402 can be compared next to each other.

In the example of FIG. 4, the chart on the left 400 shows spikes in buying behavior in the $7^{th}$ and $14^{th}$ intervals. In the example described herein, the results show a clear pattern of increased buying behavior in the $7^{th}$ and $14^{th}$ time intervals after the initial purchase of the focal product. Since the time interval is defined as 14 days, this pattern occurs 14 to 28 weeks after the initial purchase.

This is a pattern of behavior that can be analyzed further by "drilling down," or analyzing transaction data at a finer level of detail, for a specific product. In this example, the majority of the purchases occur in the home department, so further analysis should be directed at these products.

Figure 5:
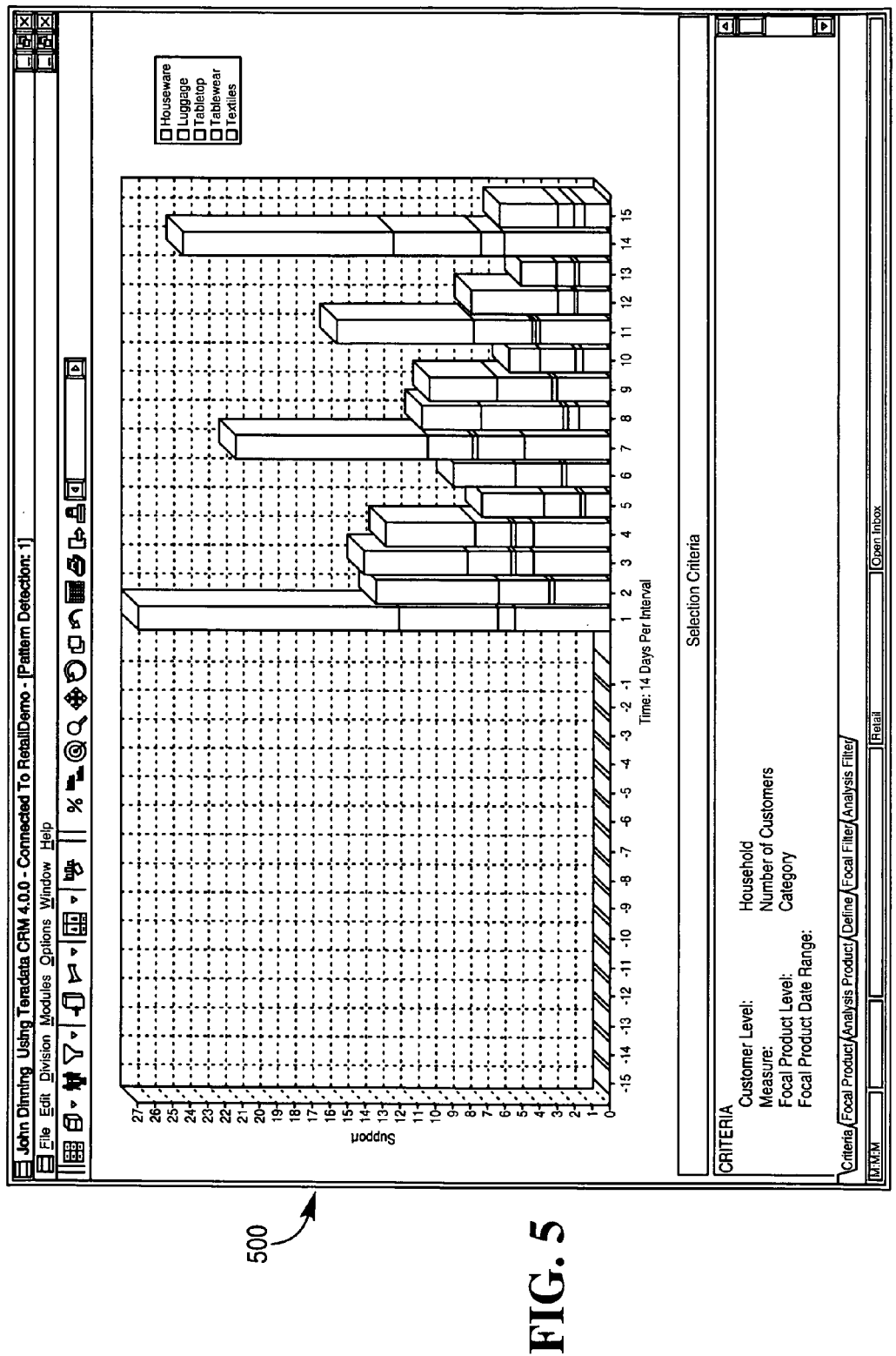
FIG. 5 is a screen snapshot that illustrates the pattern detection information displayed by a customer relationship management client according to the preferred embodiment of the present invention.

FIG. 5 is a screen snapshot that illustrates pattern detection information displayed by the CRM Client 102 according to the preferred embodiment of the present invention. The chart 500 in FIG. 5 shows the pattern detection information for specific products in the home department. The increased sales that make up this particular pattern come from sales of textiles. If the user wants to save the segment of the customer population that created this pattern, the CRM System will allow them to select different bars from the chart and create a customer segment from those customer selections.

Targeting Customers in the Chart

If a pattern is detected in a chart, the user may want to target one or more attribute ranges in the chart to further analyze the customers involved. For example, if the user sees a relationship with the purchase of two product sets in a segment of customers for the Northwest region of the country, the user may want to see if this same relationship exists for other parts of the country. Another option would be to study who is buying certain products within the analysis product set.

To get the full benefits of this information, the user should set up a multi-step campaign via the CRM Client 102 that automatically communicates to customers based upon this timeline and the purchase of the initial focal product. This will allow the user to make sure that individual customers receive follow-up communications at critical points after the initial purchase of the focal product.

Logic of the Pattern Detection Function

Figure 6:
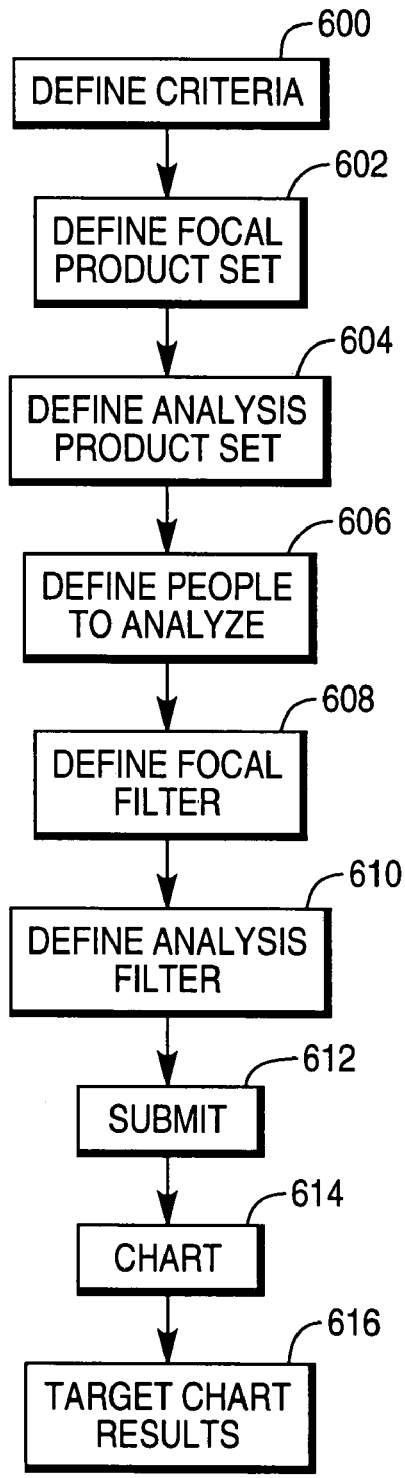
FIG. 6 is a flowchart that illustrates the logic of the pattern detection function performed by a customer relationship management client and engine according to the preferred embodiment of the present invention.

FIG. 6 is a flowchart that illustrates the logic of the pattern detection function performed by the CRM Client 102 and CRM Engine 104 according to the preferred embodiment of the present invention.

Define Criteria

In Block 600, the user specifies relevant criteria or parameters about the pattern detection function being performed. This may include specifying the customer level and the measure on which to base the resulting chart. In addition, this may include information about the focal product set and the analysis product set. The focal product set is the product on whose initial sale the analysis is based, and the analysis product set is the product to be analyzed.

In this step, the user specifies the focal product set product hierarchy level, and the time period for the focal product purchase. For example, for the purchase of the focal product set, the user might want to consider a three-month period such as the months of October through December. The user then specifies the analysis product set, the product hierarchy level, the time interval for analysis product set purchase, and the number of time intervals before and after the initial focal product purchase.

Define Focal Product Set

In Block 602, the user selects the focal product set to include in the analysis. The focal product set is that set of products whose initial purchase must occur during a specified time period. Generally, the user is looking for buying patterns after the initial purchase of focal product items with analysis product set items.

The focal product set definition can include any number of products at the product hierarchy level for the focal product that the user specified in the criteria. For example, if the user specified a focal product hierarchy level of "department" in the criteria selection process, the user might select 8 or 10 departments in this step.

Define Analysis Product Set

In Block 604, the user selects the analysis product set to include in the analysis. The analysis product set definition can include any number of products in the product hierarchy level for the analysis product specified in the criteria. The user may want to determine if any product purchase patterns are detected for customers buying any of the analysis product set after initially buying one of the focal products.

Define People to Analyze

In Block 606, the user specifies the segment of customers whose transactions are to be analyzed. A Segmentation service provided by the CRM System allows the user to create customer segments from the database managed by the RDBMS 106 based on specified attributes. The specified attributes may include customer location, customer demographics, store location, product purchases, responses to past promotions, contact history, etc. After the user specifies the attributes using the graphical interface of the CRM Client 102, the CRM Engine 104 generates SQL (Structured Query Language) statements for a query automatically, which are then processed by the RDBMS 106, and the results therefrom returned to the CRM System.

Define Focal Filter

Block 608 allows the user to define a focal filter to filter customer transaction data based on Location, Product, and Customer filters for focal product purchases. This step is optional.

Define Analysis Filter

Block 610 allows the user to define an analysis filter to filter customer transaction data based on Location, Product, and Customer filters for analysis product purchases. This step is optional.

Submit

In Block 612, the user has specified all the necessary information for the pattern detection function to determine exactly which customer transaction data should be used in the analysis. The Submit process generates the SQL statements necessary for the RDBMS 106 to select the appropriate customer transaction data from the database managed by the RDBMS 106. The pattern detection function then analyzes the selected customer transaction data, and creates a chart from the results of the analysis.

Chart

In Block 614, the pattern function creates a chart from the results of its analysis of the selected customer transaction data. Generally, the chart displays the relationship between the analysis and focal product sets, and shows the measure (purchases) for the analysis product set over time periods before and after an initial purchase of the focal product set.

Target Chart Results

Block 616 allows the user to target customer segments directly from the displayed chart. Generally, this occurs when a pattern is detected in a chart, and one or more attribute ranges in the chart are targeted to further analyze the customers involved. Customers who are identified as having an interesting purchasing pattern can be automatically saves as a new customer segment, and then used to plan new programs or campaigns to increase sales.

CONCLUSION

This concludes the description of the preferred embodiment of the invention. The following paragraphs describe some alternative embodiments for accomplishing the same invention.

In one alternative embodiment, any type of computer or configuration of computers could be used to implement the present invention. In addition, any database management system, decision support system, on-line analytic processing system, or other computer program that performs similar function could be used with the present invention.

In summary, the present invention discloses a Customer Relationship Management (CRM) system that accesses customer transaction data from a database managed by a Relational Database Management System (RDBMS), and then performs a pattern detection function using the customer transaction data, wherein the pattern detection function finds patterns in customer purchasing behavior, as evidenced by the customer transaction data, related to a sequence of when purchases occur. Specifically, the pattern detection function finds the patterns in the customer purchasing behavior by comparing a focal product set to an analysis product set over a specified time interval.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of performing customer management relationship processing in a computer, comprising:
    (a) specifying both a focal product set and an analysis product set, prior to performing a pattern detection function, based on one or more user-specified attributes, wherein the focal product set includes products that trigger a sequence of customer purchasing behavior for a specified time interval and the analysis product set includes products that describe the customer purchasing behavior;
    (b) selecting a segment of customers from a database managed by the computer based on one or more user-specified attributes;
    (c) accessing customer transaction data from the database managed by the computer, to be used in the pattern detection function, using the selected segment of customers; and
    (d) performing the pattern detection function in the computer using the customer transaction data accessed from the database managed by the computer, wherein the pattern detection function finds patterns in the customer purchasing behavior, as evidenced by the customer transaction data, related to a sequence of when purchases occur, by comparing the customer transaction data related to the focal product set to the customer transaction data related to the analysis product set using a time frame for an initial focal product set purchase, and a number of time intervals for one or more analysis product set purchases before and after the initial focal product set purchase.

2. The method of claim 1, wherein the pattern detection function identifies the patterns in the customer purchasing behavior leading up to and after a significant purchase.

3. The method of claim 1, wherein the pattern detection function discovers which of the patterns in the customer purchasing behavior are associated with future purchases.

4. The method of claim 1, wherein the pattern detection function finds the patterns in the customer purchasing behavior by comparing a focal product set to an analysis product set over a specified time interval.

5. The method of claim 4, further comprising determining when an item from the analysis product set is purchased after an initial purchase of an item from the focal product set over the specified time interval.

6. The method of claim 4, wherein the pattern detection function filters the customer transaction data using a specified attribute in order to reduce the customer transaction data examined for the focal product set.

7. The method of claim 4, wherein the pattern detection function filters the customer transaction data using a specified attribute in order to reduce the customer transaction data examined for the analysis product set.

8. The method of claim 4, further comprising specifying a measure to display for the analysis product set.

9. The method of claim 8, wherein the measure is selected from a group comprising: number of customers, sales, confidence, normalized sales, average spending amount, and support.

10. The method of claim 8, further comprising displaying a chart on the computer generated by the pattern detection function that shows the measure for the analysis product set.

11. The method of claim 10, wherein the displayed chart illustrates purchases from the analysis product set over time periods before and after an initial purchase of the focal product set.

12. The method of claim 1, further comprising specifying a customer level to determine how to aggregate the customer transaction data.

13. A customer management relationship system, comprising:
(a) a computer;
(b) logic, performed by the computer, for:
(1) specifying both a focal product set and an analysis product set, prior to performing a pattern detection function, based on one or more user-specified attributes, wherein the focal product set includes products that trigger a sequence of customer purchasing behavior for a specified time interval and the analysis product set includes products that describe the customer purchasing behavior;
(2) selecting a segment of customers from a database managed by the computer based on one or more user-specified attributes;
(3) accessing customer transaction data from the database managed by the computer, to be used in the pattern detection function, using the selected segment of customers; and
(4) performing the pattern detection function in the computer using the customer transaction data accessed from the database managed by the computer, wherein the pattern detection function finds patterns in the customer purchasing behavior, as evidenced by the customer transaction data, related to a sequence of when purchases occur, by comparing the customer transaction data related to the focal product set to the customer transaction data related to the analysis product set using a time frame for an initial focal product set purchase, and a number of time intervals for one or more analysis product set purchases before and after the initial focal product set purchase.

14. The system of claim 13, wherein the pattern detection function identifies the patterns in the customer purchasing behavior leading up to and after a significant purchase.

15. The system of claim 13, wherein the pattern detection function discovers which of the patterns in the customer purchasing behavior are associated with future purchases.

16. The system of claim 13, wherein the pattern detection function finds the patterns in the customer purchasing behavior by comparing a focal product set to an analysis product set over a specified time interval.

17. The system of claim 16, further comprising logic for determining when an item from the analysis product set is purchased after an initial purchase of an item from the focal product set over the specified time interval.

18. The system of claim 16, wherein the pattern detection function filters the customer transaction data using a specified attribute in order to reduce the customer transaction data examined for the focal product set.

19. The system of claim 16, wherein the pattern detection function filters the customer transaction data using a specified attribute in order to reduce the customer transaction data examined for the analysis product set.

20. The system of claim 16, further comprising logic for specifying a measure to display for the analysis product set.

21. The system of claim 20, wherein the measure is selected from a group comprising: number of customers, sales, confidence, normalized sales, average spending amount, and support.

22. The system of claim 20, further comprising logic for displaying a chart on the computer generated by the pattern detection function that shows the measure for the analysis product set.

23. The system of claim 22, wherein the displayed chart illustrates purchases from the analysis product set over time periods before and after an initial purchase of the focal product set.

24. An article of manufacture comprising a computer program storage device for storing instructions that, when read and executed by a computer, cause the computer to perform a method for performing customer management relationship processing in the computer, comprising:
(a) specifying both a focal product set and an analysis product set, prior to performing a pattern detection function, based on one or more user-specified attributes, wherein the focal product set includes products that trigger a sequence of customer purchasing behavior for a specified time interval and the analysis product set includes products that describe the customer purchasing behavior;
(b) selecting a segment of customers from a database managed by the computer based on one or more user-specified attributes;
(c) accessing customer transaction data from the database managed by the computer, to be used in a pattern detection function, using the selected segment of customers; and
(d) performing a pattern detection function in the computer using the customer transaction data accessed from the database managed by the computer, wherein the pattern detection function finds patterns in the customer purchasing behavior, as evidenced by the customer transaction data, related to a sequence of when purchases occur, by comparing the customer transaction data related to the focal product set to the customer transaction data related to the analysis product set using a time frame for an initial focal product set purchase, and a number of time intervals for one or more analysis product set purchases before and after the initial focal product set purchase.

25. The article of manufacture of claim 24, wherein the pattern detection function identifies the patterns in the customer purchasing behavior leading up to and after a significant purchase.

26. The article of manufacture of claim 24, wherein the pattern detection function discovers which of the patterns in the customer purchasing behavior are associated with future purchases.

27. The article of manufacture of claim 24, wherein the pattern detection function finds the patterns in the customer purchasing behavior by comparing a focal product set to an analysis product set over a specified time interval.

28. The article of manufacture of claim 27, further comprising determining when an item from the analysis product set is purchased after an initial purchase of an item from the focal product set over the specified time interval.

29. The article of manufacture of claim 27, wherein the pattern detection function filters the customer transaction data using a specified attribute in order to reduce the customer transaction data examined for the focal product set.

30. The article of manufacture of claim 27, wherein the pattern detection function filters the customer transaction data using a specified attribute in order to reduce the customer transaction data examined for the analysis product set.

31. The article of manufacture of claim 27, further comprising specifying a measure to display for the analysis product set.

32. The article of manufacture of claim 31, wherein the measure is selected from a group comprising: number of customers, sales, confidence, normalized sales, average spending amount, and support.

33. The article of manufacture of claim 31, further comprising displaying a chart on the computer generated by the pattern detection function that shows the measure for the analysis product set.

34. The article of manufacture of claim 33, wherein the displayed chart illustrates purchases from the analysis product set over time periods before and after an initial purchase of the focal product set.

* * * * *